United States Patent Office 3,658,842
Patented Apr. 25, 1972

3,658,842
SUBSTITUTED α-CYCLOALKYLIDENE-
α-PHENYL-CRESOL ETHERS
Daniel Lednicer, Kalamazoo, Mich., assignor to The
Upjohn Company, Kalamazoo, Mich.
No Drawing. Filed Feb. 11, 1969, Ser. No. 798,457
Int. Cl. C07d 27/04, 27/10
U.S. Cl. 260—326.5 M                    7 Claims

ABSTRACT OF THE DISCLOSURE

Substituted α-cycloalkylidene-α-phenyl-cresol ethers, processes for the preparation thereof and novel intermediates prepared by said processes. The novel substituted cresol ethers have utility as antilipemic agents, antifungal agents and insecticides.

BRIEF SUMMARY OF THE INVENTION

This invention relates to novel compounds, processes for the preparation of the same and novel intermediates prepared by said processes. The novel compounds of this invention have the formula:

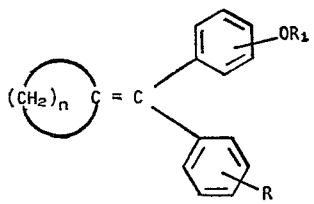

I wherein R represents hydrogen, alkyl containing from 1 to 4 carbon atoms, inclusive, alkoxy containing from 1 to 4 carbon atoms, inclusive, and halogen; $R_1$ is alkyl substituted by a group selected from the class consisting of (a) dihydroxyalkyl having from 2 to 5 carbon atoms, inclusive, (b) the group

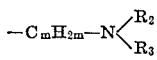

wherein $R_2$ and $R_3$ individually are similar or different alkyl groups containing from 1 to 4 carbon atoms, inclusive, and when taken together with the attached nitrogen atom form the residue of a saturated heterocyclic amine containing from 5 to 7 members, inclusive, in the ring and $m$ is an integer from 1 to 4, (c) 5-(2-thioxooxazolidinyl)-, (d) epoxyethyl, (e) 2,N-succinimido-1-hydroxyethyl, and (f) 2-amino-1-hydroxyethyl, and $n$ is an integer from 2 to 7.

The term "dihydroxyalkyl having from 2 to 5 carbon atoms, inclusive" includes 1,2-dihydroxyethyl, 1,3-dihydroxypropyl, 2,3-dihydroxypropyl, 1,4-dihydroxybutyl and the like.

The term "saturated heterocyclic amine containing from 5 to 7 members; inclusive, in the ring" is inclusive of pyrrolidino, alkylpyrrolidino such as 2-methylpyrrolidino, 2,2-dimethylpyrrolidino, 3-methylpyrrolidino and the like; piperazino, alkylpiperazino, such as 2-methylpiperazino, 4-methylpiperazino, 2,4-dimethylpiperazino; piperidino, alkylpiperidino such as 2-methylpiperidino, 3-methylpiperidino, 4,4-dimethylpiperidino, and the like; morpholino, hexamethylenimino, homopiperazino and the like.

The term "novel compounds of this invention" as used throughout the specification embraces the compounds represented by the Formula I above, the acid addition salts of those compounds wherein $R_1$ contains an amino substituent and quaternary ammonium salts of those compounds wherein the substituent $R_1$ contains a tertiary amino group.

The novel processes for making the novel compounds of this invention are illustrated in the following equations:

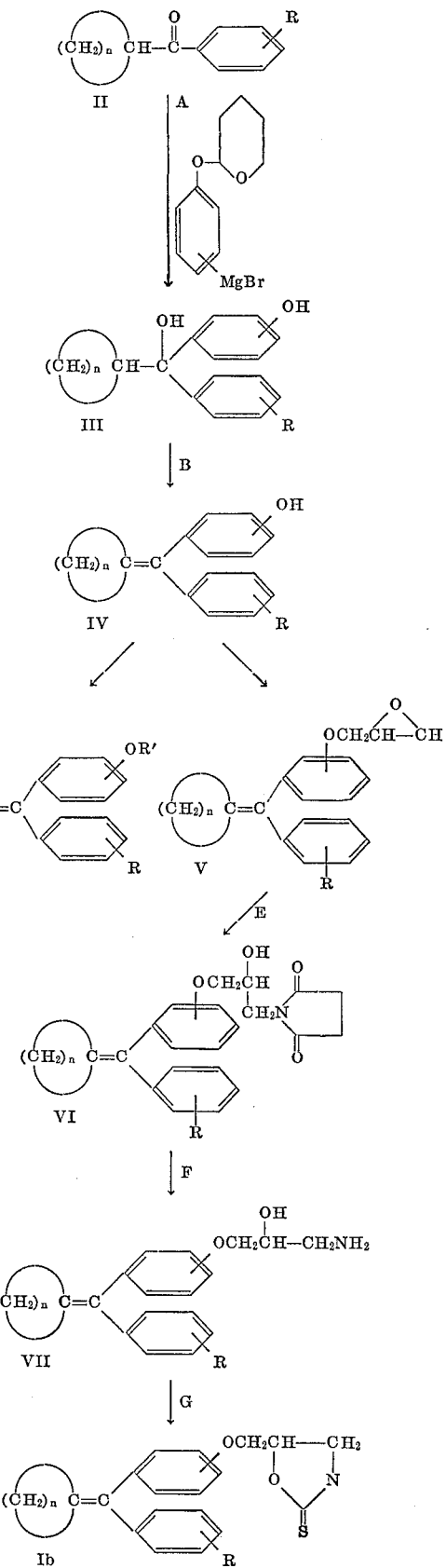

wherein R is the same as above and R' is alkyl substituted by a group selected from the class consisting of (a) dihydroxyalkyl, having from 2 to 5 carbon atoms, inclusive, and (b) tertiaryaminoalkyl

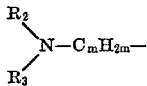

wherein $R_2$ and $R_3$ and $n$ are the same as above.

DETAILED DESCRIPTION

The starting cycloalkyl aryl ketones (II) are readily prepared by reacting an acid having the formula

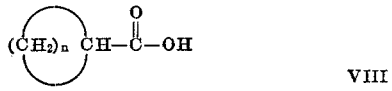

VIII wherein $n$ is the same as above, and the appropriately substituted benzene. The acid is first converted to its corresponding acyl chloride and then the acyl chloride is allowed to react with the benzene compound in the presence of a "Lewis acid," such as aluminum chloride or boron trifluoride. This represents the classical Friedel-Crafts reaction. All of the acids embraced by Formula VIII are known and can be prepared by procedures that are well known in the art.

The compounds of Formula I wherein $R_1$ is alkyl substituted by a dihydroxyalkyl group or a tertiary aminoalkyl group (Ia) are prepared in accordance with reaction scheme A, B and C.

In reaction A the ketone (II) is reacted with the Grignard reagent obtained from p-(2-tetrahydropyranyloxy) bromobenzene. The reaction proceeds smoothly at room temperature (25° C.); however, if desired it may be conducted at higher or lower temperatures.

Reaction B represents dehydration of the carbinol (III) to form an α-cycloalkylidine-α-phenyl-cresol (IV). The dehydration may be carried out by heating the carbinol either alone or in the presence of various materials. For example, it may be heated either under atmospheric pressure or under a vacuum in the presence of potassium acid sulfate or it may be refluxed in benzene in the presence of p-tolunesulfonic acid. Details of this type of dehydration along with various other materials that may be utilized to facilitate it are described in U.S. Pat. No. 3,287,397.

The alkylation of the α-cycloalkylidene-α-phenyl-cresol (IV) to form the ethers of Formulae Ia and V (Reactions C and D, respectively) is readily accomplished by methods well known in the art for the etherification of phenols. Illustratively, the compounds of Formula Ia wherein $R'_1$ is tertiaryaminoalkyl can be prepared by treating the compound of Formula IV with the appropriate tertiary-aminoalkyl halide in the presence of a base such as sodium hydride, sodium methoxide and the like. The etherification is conducted advantageously in the presence of an inert organic solvent such as tetrahydrofuran, dioxane, dimethylformamide or benzene.

Similarly the compounds of Formula Ia wherein $R'_1$ is alkyl substituted by dihydroxy alkyl and the compound of Formula V, which is substituted by epoxyethyl, can be prepared by alkylating the compounds of Formula IV with the appropriate dihydroxyalkyl halide (Reaction C) and epoxyalkyl halide (Reaction D) respectively in the presence of a base such as sodium hydroxide, sodium methoxide, and the like. The alkylation is conducted advantageously in the presence of an organic solvent such as tetrahydrofuran, dioxane, a lower alkanol, e.g., methanol, ethanol isopropanol, and the like.

The compounds of Formula I, wherein $R_1$ is 5-(2-thioxooxazolidinyl)- are prepared in accordance with reaction scheme A, B, D, E and F. Steps A, B and D have been described above.

In step (E), the epoxy (V) is reacted with succinimide in the presence of a base such as pyridine, piperidine, N-methyl-piperidine, and the like, whereby the epoxy ring is opened and the corresponding N-3-[[α-cycloalkylidene-α-phenyl-tolyl]oxy]-2-hydroxy-propylsuccinimide (VI) is obtained. The compound of Formula VI is reacted first with a mixture of sodium hydroxide and then with an aqueous solution of a hydrohalide (Step F) to yield the corresponding 3-[[α-cycloalkylidene-α-phenyl-tolyl]oxy]-2-hydroxy-propylamine hydrohalide. The hydrohalide is then reacted with a solution of methanolic sodium methoxide to yield 3-[[α-cycloalkylidene-α-phenyl-tolyl]oxy]-2-hydroxypropylamino (VII).

In the final step (G), the compound of Formula VII is converted to the corresponding 5-[[[α-cycloalkylidene-α-phenyltolyl]oxy]methyl]-2-oxazolidenethione, by reaction with carbon disulfide in the presence of a base such as potassium hydroxide, sodium hydroxide, potassium carbonate, and the like. The procedures employed can be those described in the art; see, for example, Bruson et al., J. Amer. Chem. Soc. 59, 2011, 1937. The reaction is preferably conducted in the presence of an organic solvent such as tetrahydrofuran, dioxane, ethanol, isopropyl alcohol, and the like. Also, elevated temperatures e.g., the reflux temperature of the reaction mixture, are advantageously employed in the reaction.

The acid addition salts of the invention comprise the salts of the compounds of Formula I wherein $R_1$ contains an amino substituent with pharmacologically acceptable acid such as sulfuric, hydrochloric, nitric, phosphoric, lactic, benzoic, methanol-sulfonic, p-toluenesulfonic, salicylic, acetic, propionic, maleic, malic, tartaric, citric, cyclohexanesulfamic, succinic, nicotinic, ascorbic acids, and the like.

The quaternary ammonium salts of the invention are the salts obtained by reacting the tertiary amino compounds of Formula I with quaternating agents, for example, alkyl halide, alkenyl halides, dialkyl sulfates, alkyl arylsulfonates, and the like. The term "alkyl" means an alkyl group containing from 1 to 4 carbon atoms, inclusive. The term alkenyl means an alkenyl group containing from 3 to 8 carbon atoms, inclusive, such as allyl, butenyl, pentenyl, hexenyl, heptenyl, octenyl, and isomeric forms thereof. The term "aralkyl" means an aralkyl group containing from 7 to 13 carbon atoms, inclusive, such as benzyl, phenylethyl, phenylpropyl, benzhydryl and the like. The term "alkyl arylsulfonate" means the esters formed from alkanols and arylsulfonic acids such as benzenesulfonic, toluenesulfonic, xylenesulfonic, and like acids. Examples of quaternary salts of the compounds of the invention are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate, and the like.

The novel compounds of this invention are useful in the treatment of hyperlipemic states in animals. Illustratively, the compounds 3-[[α-cyclohexylidene-α-(p-methoxyphenyl)-p-tolyl]oxy]-1,2-propanediol and 1-[2-[[α-cyclohexylidene-α-(p-methoxyphenyl) - p - tolyl]oxy]ethyl]-pyrrolidine hydrochloride when administered orally to Sprague-Dawley male rats exhibited serum cholesterol and triglyceride reducing activity.

Also, the compounds of Formula I, wherein $R_1$ is alkoxy substituted by a tertiaryamino alkyl group, have been found to have antifungal activity. For example, in concentrations of 50 mcg./ml., both the 1-[2-[[α-cyclopentylidene-α-(p-ethoxyphenyl) - p - tolyl]oxy]ethyl]pyrrolidine hydrochloride and 1-[2-[[α-cyclohexylidene-α-(p-methoxyphenyl) - p - tolyl]oxy]ethyl]-pyrrolidine hydrochloride inhibit the growth of *Pythium debaryanum*. In addition, the same concentration of the later compound inhibits the growth of *Rhizoctonia solani*. Both of these compounds also exhibit insecticidal activity when they are made part of a solution (concentration of about 0.2 percent) and applied to crickets.

The compounds of Formula I wherein $R_1$ is lower alkyl substituted by 5-(2-thioxooxazolidinyl)- also exhibit insecticidal activity when applied to crickets in concentrations of about 0.2 percent.

The compounds of Formula I wherein $R_1$ is lower alkyl substituted by dihydroxyalkyl wherein dihydroxyalkyl is as hereinbefore described, and $n$ is 4, also exhibit anticonvulsant activity when administered intraperitoneally to mice at a dosage of 30 mg./kg.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles for oral or parenteral administration.

EXAMPLE 1

α-Cyclohexylidene-α-(p-methoxyphenyl)-p-cresol

A solution of 16.20 g. of cyclohexyl p-methoxyphenyl ketone in 150 ml. of tetrahydrofuran is added to a solution of the Grignard reagent prepared from 20 g. of p-(tetrahydropyranyloxy)-bromobenzene and 2.0 g. of magnesium in 200 ml. of tetrahydrofuran. Following 15 hours standing at room temperature the mixture is treated with 150 ml. of 2.5 N hydrochloric acid. The organic layer is separated, washed with water and a saturated solution of sodium chloride and taken to dryness. The residue is dissolved in 600 ml. of methanol and 150 ml. of 2.5 N hydrochloric acid is added. The mixture is stirred at 25° C. for 4 hours and the bulk of the solvent removed in vacuum. The waxy solid which came out is collected on a filter and dissolved in ether. The organic solution is washed with water and a saturated solution of sodium chloride and taken to dryness. The residue is recrystallized twice from cyclohexane to give 6.64 g. of solid α-cyclohexylidene-α-(p-methoxyphenyl)-p-cresol melting point 143–146° C. (lit. 145–146° C.).

Using the procedure described in Example 1 but replacing cyclohexyl-p-methoxyphenyl ketone by cyclohexyl phenyl ketone, cyclohexyl-p-methylphenyl ketone, and p-chlorophenyl cyclohexyl ketone, there are obtained (α-cyclohexylidene-α-phenyl)-p-cresol, α-cyclohexylidene-α-(p-methylphenyl)-p-cresol and α-(p-chlorophenyl)-α-cyclohexylidene-p-cresol respectively.

EXAMPLE 2

3-[[α-cyclohexylidene-α-(p-methoxyphenyl)-p-tolyl]-oxy]-1,2-propanediol

A solution of 2.40 g. of α - cyclohexylidene - α - (p-methoxyphenyl) - p - cresol (Example 1) in 50 ml. of methanol is treated with 2.01 ml. of 4.46 methanolic sodium in methanol. Following 15 minutes stirring at a temperature of 25° C. 1.01 g. of 1-chloro-2,3-propanediol is added and the mixture heated at reflux for 16 hours. Methanol is removed and the residue dissolved in a mixture of ether and water. The organic layer is separated, washed with water and a saturated solution of sodium chloride and then taken to dryness. The residual gum is chromatographed over Florisil (magnesium silicate) (elution with 10 and then 50 percent acetone in Skellysolve B hexanes) to give 1.60 g. of crude product. This product is recrystallized twice from aqueous methanol to afford 1.58 g. of crystalline 3-[[α-cyclohexylidene-α - (p-methoxyphenyl)-p-tolyl]oxy] - 1,2 - propanediol, melting point 97–99° C.

Analysis.—Calcd. for $C_{23}H_{28}O_4$ (percent): C, 74.97; H, 7.66. Found (percent): C, 74.79; H, 7.88.

Using the procedure described in Example 2, but replacing α-cyclohexylidene - α - (p - methoxyphenyl)-p-cresol by the appropriately substituted α-cyclohexylidene-α-phenyl-cresol is productive of the corresponding [[α-cyclohexylidene - α - phenyltolyl]oxy]-1,2-propanediol. Representative of the propanediols so obtained are:

3-[[α-cyclohexylidene-α-(o-methoxyphenyl)-o-tolyl]oxy]-,
3-[[α-cyclohexylidene-α-(m-methoxyphenyl)-m-tolyl]oxy]-,
3-[[α-cyclohexylidene-α-phenyl-p-tolyl]oxy]-,
3-[[α-cyclohexylidene-2-(p-methylphenyl)-p-tolyl]oxy]-,
3-[[α-cyclohexylidene-α-(p-chlorophenyl)-p-tolyl]oxy]-,
3-[[α-cyclohexylidene-α-(o-chlorophenyl)-p-tolyl]oxy]-,
3-[[α-cyclohexylidene-α-(m-chlorophenyl)-p-tolyl]oxy]-,
3-[[α-cyclohexylidene-α-(p-methoxyphenyl)-o-tolyl]oxy]-,
3-[[α-cyclohexylidene-α-(m-methoxyphenyl)-m-tolyl]oxy]-1,2-propanediols.

Similarly, using the procedure described in Example 2, but replacing 1 - chloro - 2,3 - propanediol with 1-chloro - 3,4 - butanediol there is obtained 4-[[α-cyclohexylidene - α - (p-methoxyphenyl) - p - tolyl]oxy]-1,2-butanediol.

EXAMPLE 3

1 - [2 - [[α - cyclohexylidene - α - (p - methoxyphenyl)- p - tolyl]oxy]ethyl] - pyrrolidine and hydrochloride thereof A solution of 2.50 g. of α-cyclohexylidene-α-(p-methoxyphenyl)-p-cresol (Example 1) in 20 ml. of dimethylformamide and 100 ml. of benzene is treated with 0.36 g. of 56% sodium hydride in mineral oil. When the effervescence has ceased, 2.17 g. of a 1:1 mixture of a β-chloroethylpyrrolidine and toluene is added. The mixture is heated overnight at reflux and the solvent removed in vacuum. The residue is taken up in a mixture of ether and water and then the ether and aqueous phases are separated. The ether phase is extracted with three portions of 2.5 N hydrochloric acid. This extract is then washed with five portions of methylene chloride. After the fifth washing, the mixture is taken to dryness and the residue recrystallized twice from methanol. There is obtained 3.07 g. of 1 - [2 - [[α - cyclohexylidene - α - (p-methoxyphenyl) - p - tolyl]oxy]ethyl]-pyrrolidine hydrochloride, melting point 95–97° C.

Analysis.—Calcd. for $C_{26}H_{39}ClNO_2$ (percent): C, 72.96; H, 8.01; Cl, 8.26. Found (percent): C, 72.34; H, 8.27; Cl, 8.30.

The free base is prepared by basifying the hydrochloride with methanolic sodium methoxide and evaporating the mixture to dryness.

Using the procedure described in Example 2, but replacing α-cyclohexylidene - α - (p - methoxyphenyl)-p-cresol by the appropriately substituted α-cyclohexylidene-α-methoxyphenyl-p-cresol and β - chloroethylpyrrolidine by the appropriately substituted tertiaryaminoalkylhalide, there are obtained the corresponding substituted [[[cyclohexylidene - α - phenyl - p - tolyl]oxy]alkyl]amines and the hydrochlorides thereof. Representative of the substituted [[[cyclohexyldiene - α - phenyl - p - tolyl]oxy]-alkyl]-amines and corresponding hydrochlorides so prepared are 1-[2-[[α-cyclohexylidene-α-(o-methoxyphenyl)-o-tolyl]oxy]ethyl]-,
1-[2-[[α-cyclohexylidene-α-(o-methoxyphenyl)-m-tolyl]oxy]ethyl]-,
1-2-[[α-cyclohexylidene-α-phenyl-p-tolyl]oxy]ethyl]-,
1-[2-[[α-cyclohexylidene-α-(p-methylphenyl)-p-tolyl]oxy]ethyl]-,
1-[2-[[α-cyclohexylidene-α-(p-chlorophenyl)-p-tolyl]oxy]ethyl]-, 1-[2-[[α-cyclohexylidene-α-(o-chlorophenyl)-p-tolyl]oxy]ethyl]-,
1-[2-[[α-cyclohexylidene-α-(m-chlorophenyl)-p-tolyl]oxy]ethyl]-,
1-[2-[[α-cyclohexylidene-α-(p-methoxyphenyl)-o-tolyl]oxy]ethyl]-,
1-[2-[[α-cyclohexylidene-α-(m-methoxyphenyl)-m-tolyl]oxy]ethyl]-,
1-2-[[α-cyclohexylidene-α-(m-methoxyphenyl)-p-tolyl]oxy]ethyl]-,
1-[3-[[α-cyclohexylidene-α-(m-methoxyphenyl)-p-tolyl]oxy]ethyl]-,
1-[4-[[α-cyclohexylidene-α-(p-methoxyphenyl)-p-tolyl]oxy]butyl]-pyrrolidines,
1-[2l[[α-cyclohexylidene-α-(p-methoxyphenyl)-p-tolyl]oxy]ethyl]-piperazine,
1-[2-[[α-cyclohexylidene-α-(p-methoxyphenyl)-p-tolyl]oxy]ethyl]-piperazine,
4-[2-[[α-cyclohexylidene-α-(p-methoxyphenyl)-p-tolyl]oxy]ethyl]-morpholine,
1-[2-[[α-cyclohexylidene-α-(p-methoxyphenyl)-p-tolyl]oxy]ethyl]-hexamethyleneimine,
1-[2-[[α-cyclohexylidene-α-(p-methoxyphenyl)-p-tolyl]oxy]-ethyl]-3-methylpyrrolidine,
1-[2-[[α-cyclohexylidene-α-(p-methoxyphenyl)-p-tolyl]oxy]ethyl]-4-methylpiperazine,
1-[2-[[α-cyclohexylidene-α-(p-methoxyphenyl)-p-tolyl]oxy]ethyl]-2-methylpiperidine,
2-[[α-cyclohexylidene-2-(p-methoxyphenyl)-p-tolyl]oxy]-N,N-diethylethylamine,
2-[[α-cyclohexylidene-α-(p-methoxyphenyl)-p-tolyl]oxy]-N,N-dimethylethylamine and the hydrochlorides thereof.

EXAMPLE 4

5-[[[α-cyclohexylidene-α-(p-methoxyphenyl)-p-tolyl]oxy]methyl]-2-oxazolidinethione (A) 3-[[α-CYCLOHEXYLIDENE-α-(p-METHOXYPHENYL)-p-TOLYL]OXY]-1,2-EPOXYPROPANE To a solution of 4.74 g. of α-cyclohexylidene-α-(p-methoxyphenyl) - p - cresol (Example 1) in 20 ml. of dimethylformamide and 100 ml. of benzene there is added 0.70 g. of 53% sodium hydride in mineral oil. Following 30 minutes stirring at room temperature there is added 1.60 g. of epichlorohydrin in 20 ml. of benzene. The mixture is heated at reflux for 16 hours and then concentrated in vacuum. The residue is dissolved in a mixture of water and ether and then the aqueous and organic phases are separated. The organic phase is washed in turn with water, a saturated solution of sodium chloride and then taken to dryness. The residue, which is in the form of a gum, is chromatographed on 600 ml. of Florisil (elution with 8% acetone in Skellysolve B hexanes) to give 3.44 g. of 3 - [[α - cyclohexylidene-α-(p-methoxyphenyl) - p - tolyl]oxy] - 1,2 - epoxypropane as oily crystals followed by 1.60 g. of the dimer 1,3-bis[[α-cyclohexylidene - α - (p - methoxyphenyl) - p - tolyl]oxy]-2-propanol, melting point 157–161° C. After recrystallization from a mixture of methylene chloride and Skellysolve B hexanes, the dimer has a melting point of 157–160° C.

Analysis.—Calcd. for $C_{43}H_{48}O_5$ (percent): 80.09; H, 7.70. Found (percent): C, 79.37; H, 7.50.

The oily crystals are rechromatographed on Florisil (elution with 5% acetone in Skellysolve B hexanes). The crystalline fractions are combined and recrystallized twice from Skellysolve B to yield 3-[[α-cyclohexylidene-α-(p-methoxyphenyl)-p-tolyl]oxy]-1,2-epoxypropane.

(B) N-3-[[α-CYCLOHEXYLIDENE-α-(p-METHOXYPHENYL)-p-TOLYL]OXY]-2-HYDROXY-PROPYLSUCCINIMIDE

A mixture of 3.92 g. of 3-[[α-cyclohexylidene-α-(p-methoxyphenyl)-p-tolyl]oxy]-1,2 - epoxypropane (Example 4, step A), 1.18 g. of succinimide and 6 drops of pyridine is heated at reflux for two days. The mixture is chromatographed on 600 ml. of Florisil (elution with a 1:1 mixture of acetone and Skellysolve B hexanes). The crystalline fractions are combined and recrystallized from aqueous methanol to yield 2.84 g. of N-3-[[α-cyclohexylidene-α-(p-methoxyphenyl) - p - tolyl]oxy]propylsuccinimide, melting point 111–121° C. After further recrystallization the product melted at 130–131.5° C.

Analysis.—Calcd. for $C_{27}H_{31}NO_5$ (percent): C, 72.14; H, 6.95. Found (percent): C, 71.80; H, 6.92.

Using the procedure described in Example 4, step B, but replacing 3 - [[α - cyclohexylidene-α-(p-methoxyphenyl)-p-tolyl]oxy]-1,2-epoxypropane by the appropriately substituted 3-[[α-cyclohexylidene-α-phenyl-p-tolyl] oxy]-1,2-epoxypropane is productive of the corresponding N - 3 - [[α-cyclohexylidene-α-phenyl-p-tolyl]oxy]-2-hydroxypropylsuccinimide. Representative of the propyl succinimides so prepared are N-3-[[α-cyclohexylidene-α-(o-methoxyphenyl)-p-tolyl]oxy]-,
N-3-[[α-cyclohexylidene-α-(m-methoxyphenyl)-m-tolyl]oxy]-,
N-3-[[α-cyclohexylidene-α-phenyl-p-tolyl]oxy]-,
N-3-[[α-cyclohexylidene-α-(p-tolyl)-p-tolyl]oxy]-,
N-3-[[α-cyclohexylidene-α-(p-chlorophenyl)-p-tolyl]oxy]-,
N-3-[[α-cyclohexylidene-α-(o-chlorophenyl)-p-tolyl]oxy]-,
N-3-[[α-cyclohexylidene-α-(m-chlorophenyl)-p-tolyl]oxy]-,
2-hydroxy-propylsuccinimides.

(C) 3 - [[α - CYCLOHEXYLIDENE - α - (p - METHOXYPHENYL) - p - TOLYL]OXY] - 2 - HYDROXY - PROPYLAMINE HYDROCHLORIDE

A mixture of 2.74 g. of N-3-[[α-cyclohexylidene-α-(p-methoxyphenyl)-p-tolyl]oxy] - 2 - hydroxy-propylsuccinimide (Example 4, step B) and 11 ml. of 50% sodium hydroxide in 165 ml. of ethanol is heated at reflux for 16 hours. The mixture is then concentrated at reduced pressure and the residue treated with 2.5 N hydrochloric acid. The mixture is extracted with three portions of methylene chloride. The gum which remains when the extract is taken to dryness is precipitated once from acetone with 2.5 N hydrochloric acid. There is obtained 2.32 g. of solid 3 - [[α-cyclohexylidene-α-(p-methoxyphenyl)-p-tolyl]oxy]-2-hydroxy-propylamine hydrochloride, which does not show a congruent melting point.

(D) 3-[[α-CYCLOHEXYLIDENE-α-(p-METHOXYPHENYL)-p-TOLYL]OXY]-2-HYDROXY-PROPYLAMINE

To a solution of 1.30 g. of 3-[[α-cyclohexylidene-α-(p-methoxyphenyl)-p-tolyl]oxy] - 2 - hydroxy-propylamine hydrochloride (Example 4, part C) in 20 ml. of methanol there is added 7.3 ml. of 0.49 N methanolic sodium methoxide. The mixture when taken to dryness yields a residue which is predominantly 3-[[α-cyclohexylidene-α-(p-methoxyphenyl)-p-tolyl]oxy]-2-hydroxy-propylamine.

(E) 5 - [[[α - CYCLOHEXYLIDENE-α-(p-METHOXYPHENYL) - p - TOLYL]OXY]METHYL] - 2 - OXAZOLIDINETHIONE

The 3 - [[α - cyclohexylidene-α-(p-methoxyphenyl)-p-tolyl]oxy]-2-hydroxy-propylamine prepared in Example 4, part B is dissolved in 45 ml. of ethanol. There is then added 0.40 ml. of carbon disulfide and 1.5 ml. of 25% aqueous sodium hydroxide. Following 4 hours heating at reflux the solution is taken to dryness. The residue is suspended in water, made acidic with 2.5 N hydrochloric acid and the precipitate collected on a filter. Several recrystallizations from aqueous acetone affords 0.90 g. of 5[[[α-cyclohexylidene - α - (p - methoxyphenyl)-p-tolyl]oxy] methyl]-2-oxazolidinethione, melting point 180–183° C.

Analysis.—Calcd. for $C_{24}H_{27}NO_3S$ (percent): C, 70.38; H, 6.65; N, 3.42; S, 7.83. Found (percent): C, 70.07; H, 6.96; N, 3.48; S, 7.43.

EXAMPLE 5

*α-Cyclopentylidene-α-(p-methoxyphenyl)-p-cresol*

To an ice-cooled solution of the Grignard reagent prepared from 25.7 g. of p-(2-tetrahydropyranyloxy)bromobenzene and 2.43 g. magnesium in 250 ml. of tetrahydrofuran there is added 18 g. of cyclopentyl anisyl ketone in 200 ml. of tetrahydrofuran. Following 16 hours of standing at room temperature, the mixture is cooled in ice and treated with 100 ml. of saturated ammonium chloride. Ether is added and the organic phase separated from the inorganic phase. The organic phase is washed in turn with water and a saturated solution of sodium chloride. The waxy solid which remains when the solvent is removed is recrystallized twice from aqueous methanol to give 15.04 g. of α - cyclopentylidene-α-(p-methoxyphenyl)-p-cresol, melting point 112–115.5° C.

Using the procedure described in Example 5 but replacing anisyl cyclopentyl ketone by phenyl cyclopentyl ketone, p-methylphenyl cyclopentyl ketone, and p-chlorophenyl cyclopentyl ketone, there are obtained α-cyclopentylidene-α - phenyl - p - cresol, α-cyclopentylidene-α-(p-methylphenyl) - p - cresol and α-cyclopentylidene-α-(p-chlorophenyl)-p-cresol respectively.

EXAMPLE 6

*1-[2-[[α-Cyclopentylidene-α-(p-methoxyphenyl)-p-tolyl]oxy]ethyl]-pyrrolidine and hydrochloride thereof*

A solution of 5.60 g. of α-cyclopentylidene-α-(p-methoxyphenyl)-p-cresol (Example 5) in 50 ml. of dimethylformamide and 250 ml. of benzene is treated with 0.85 g. of 56% sodium hydride in mineral oil. When the effervescence ceases, 5.10 g. of a 1:1 mixture of β-chloroethylpyrrolidine and toluene is added. The mixture is heated overnight at reflux and the solvent removed in vacuum. The residue is taken up in ether and water. After the organic and aqueous phases are separated, the organic phase is extracted with three 50 ml. portions of 2.5 N hydrochloric acid. The extract is then washed with five 50 ml. portions of methylene chloride. This last solution is taken to dryness and the residue recrystallized twice from a mixture of methylene chloride and ethyl acetate. There is obtained 6.50 g. of 1[2-[[α-cyclopentylidene-2-(p-methoxyphenyl)-β-tolyl]oxy]ethyl]-pyrrolidine hydrochloride, melting point 196.5–199° C.

*Analysis.*—Calcd. for $C_{25}H_{32}ClNO_2$ (percent): C, 72.53; H, 7.79; Cl, 8.57. Found (percent): C, 72.24; H, 7.95; Cl, 8.90.

The free base is prepared by basifying the hydrochloride with methanolic sodium methoxide and evaporating the mixture to dryness.

Using the procedure described in Example 6, but replacing α - cyclopentylidene-(p-methoxyphenyl)-p-cresol by the appropriately substituted α-cyclopentylidene-phenyl-cresol and β-chloroethylpyrrolidine by the appropriately substituted tertiaryaminoalkyl halide, there are obtained the corresponding [[α-cyclopentylidene-α-pheny-tolyl]oxy]alkyl]-tertiaryamines and the hydrochlorides thereof. Representative of the tertiary amines and corresponding hydrochlorides so prepared are 1-[2-[[α-cyclopentylidene-α-(o-methoxyphenyl)-o-tolyl]oxy]ethyl]-,
1-[2-[[α-cyclopentylidene-α-(o-methoxyphenyl)-m-tolyl]oxy]ethyl]-,
1-[2-[[α-cyclopentylidene-α-phenyl-p-tolyl]oxy]ethyl]-,
1-[2-[[α-cyclopentylidene-α-(p-methylphenyl)-p-tolyl]oxy]ethyl]-,
1-[2-[[α-cyclopentylidene-α-(p-chlorophenyl)-p-tolyl]oxy]ethyl]-,
1-[2-[[α-cyclopentylidene-α-(o-chlorophenyl)p-tolyl]oxy]ethyl]-,
1-[2-[[α-cyclopentylidene-α-(m-chlorophenyl)-p-tolyl]oxy]ethyl]-,
1-[2-[[α-cyclopentylidene-(p-methoxyphenyl)-o-tolyl]oxy]ethyl]-,
1-[2-[[α-cyclopentylidene-α-(m-methoxyphenyl)-m-tolyl]oxy]ethyl]-,
1-[2-[[α-cyclopentylidene-α-(m-methoxyphenyl-p-tolyl]oxy]ethyl]-,
1-[3-[[α-cyclopentylidene-α-(m-methoxyphenyl)-p-tolyl]oxy]ethyl]-,
1-[4-[[α-cyclopentylidene-α-(p-methoxyphenyl)p-tolyl]oxy]butyl]pyrrolidine,
1-[2-[[α-cyclopentylidene-α-(p-methoxyphenyl)-p-tolyl]oxy]ethyl]piperazine,
1-[2[[α-cyclopentylidene-2-(p-methoxyphenyl)-p-tolyl]oxy]ethyl]piperazine,
4-[2-[[α-cyclopentylidene-α-(p-methoxyphenyl)-p-tolyl]oxy]ethyl]morpholine,
1-[2-[[α-cyclopentylidene-α-(p-methoxyphenyl)p-tolyl]oxy]ethyl]hexamethyleneimine,
1-[2-[[α-cyclopentylidene-α-(p-methoxyphenyl)-p-tolyl]oxy]ethyl]-3-methylpyrrolidine,
1-[2-[[α-cyclopentylidene-α-(p-methoxyphenyl)-p-tolyl]oxy]ethyl]-2-methylpiperidine,
1-[2-[[α-cyclopentylidene-α-(p-methoxyphenyl)-p-tolyl]oxy]ethyl]-2-methylpiperidine,
2-[[α-cyclopentylidene-α-(p-methoxyphenyl)-p-tolyl]oxy]ethyl]-N,N-diethylethylamine,
2-[[α-cyclopentylidene-α-(p-methoxyphenyl)-p-tolyl]oxy]ethyl]-N,N-dimethylethylamine, and the hyldrochlorides thereof.

EXAMPLE 7

*3-[[α-cyclopentylidene-α-(p-methoxyphenyl)-p-tolyl]-oxy]-1,2-propanediol*

A solution of 5.60 g. of α-cyclopentylidene-α-(p-methoxyphenyl)-p-cresol (Example 5) in 100 ml. of methanol is treated with 5 ml. of 4.46 N sodium methoxide in methanol. Following 15 minutes stirring at a temperature of 25° C. 2.50 g. of 1-chloro-2,3-propanediol is added and the mixture heated at reflux for 16 hours. The methanol is removed and the residue dissolved in a mixture of ether and water. After the organic phase is separated from the aqueous phase, it is washed with water, a saturated solution of sodium chloride and then taken to dryness. The residual gum is chromatographed over Florisil (elution with 10 and then 50% acetone in Skellysolve B hexanes) to give 3.69 g. of the crude product. This product is recrystallized twice from aqueous methanol to afford 3.50 g. of 3-[[α-cyclopentylidene-α-(p - methoxyphenyl)-p-tolyl]oxy]-1,2,-propanediol, melting point 56–68° C.

*Analysis.*—Calcd. for $C_{22}H_{26}O_4 \cdot \frac{1}{2}H_2O$ (percent): C, 72.69; H, 7.49. Found (percent): C, 73.38; H, 7.63.

Using the procedure described in Example 7, but replacing α - cyclopentylidene - α - (p-methoxyphenyl)-p-cresol by the appropriately substituted α-cyclopentylidene-α-phenyl-cresol is productive of the corresponding [[α-cyclohexylidene - α - phenyl-tolyl]oxy]-1,2-propanediol. Representative of the propanediols so obtained are 3-[[α-cyclopentylidene-α-(o-methoxyphenyl)-o-tolyl]oxy]-,
3-[[α-cyclopentylidene-α-(m-methoxyphenyl)-m-tolyl]oxy]-,
3-[[α-cyclopentylidene-α-phenyl-p-tolyl]oxy]-,
3-[[α-cyclopentylidene-α-(p-methylphenyl)-p-tolyl]oxy]-,
3-[[α-cyclopentylidene-α-(p-chlorophenyl)-p-tolyl]oxy]-,
3-[[α-cyclopentylidene-α-(o-chlorophenyl)-p-tolyl]oxy]-,
3-[[α-cyclopentylidene-α-(m-chlorophenyl)-p-tolyl]oxy]-,
3-[[α-cyclopentylidene-α-(p-methoxyphenyl)-o-tolyl]oxy]-,
3-[[α-cyclopentylidene-α-(m-methoxyphenyl)-m-tolyl]oxy]-1,2-propanediols.

Similarly, using the procedure described in Example 7, but replacing 1-chloro-2,3-propanediol with 1-chloro-3,4-butanediol there is obtained 4-[α-cyclopentylidene-α-(p-methoxyphenyl)p-tolyl]-1,2-butanediol.

EXAMPLE 8

5-[[[α-cyclopentylidene-α-(p-methoxyphenyl)-p-tolyl]oxy]methyl]-2-oxazolidinethione (A) 3 - [[α - CYCLOPENTYLIDENE - α - (p - METHOXYPHENYL) - p - TOLYL]OXY] - 1,2 - EPOXYPROPANE To a solution of 10.00 g. of α-cyclopentylidene-α-(p-methoxyphenyl) - p - cresol (Example 5) in 50 ml. of dimethylformamide and 250 ml. of benzene there is added 1.55 g. of 56% sodium hydride in mineral oil. Following 30 minutes stirring at room temperature there is added 3.36 g. of epichlorohydrin in 10 ml. of benzene. The mixture is heated at reflux for 16 hours and then concentrated in vacuum. The residue is dissolved in a mixture of water and ether and then the organic phase separated from the aqueous phase. The organic phase is washed in turn with water, a saturated solution of sodium chloride and then taken to dryness. The residue is chromatographed on Florisil (elution with a mixture of acetone and Skellysolve B hexanes). Those fractions which are similar by thin layer chromatography are combined to afford 5.40 g. of 3-[[α-cyclopentylidene-α-(p-methoxyphenyl) - p-tolyl]oxy]-1,2-epoxypropane, which is in the form of a gum.

(B) N - 3 - [[α - CYCLOPENTYLIDENE - α - (p - METHOXYPHENYL) - p - TOLYL]OXY] - 2 - HYDROXY - PROPYLSUCCINIMIDE

A mixture of 5.10 g. of 3-[[α-cyclopentylidene-α-(p-methoxyphenyl)-p-tolyl]oxy]-1,2-epoxypropane, 1.60 g. of succinimide and 7 drops of pyridine is heated at reflux for two days. The mixture is chromatographed on 600 ml. of Florisil (elution with a 1:1 mixture of acetone and Skellysolve B hexanes). The fractions which show similar compositions on a thin layer chromatograph are combined to yield 3.72 g. of N-3-[[α-cyclopentylidene-α-(p-methoxyphenyl)-p-tolyl]oxy] - 2-hydroxy-propylsuccinimide in the form of a gum.

Using the procedure described in Example 8, part B, but replacing 3-[[α-cyclopentylidene-α-(p-methoxyphenyl)-p-tolyl]-oxy]-1,2-epoxypropane by the appropriately substituted 3 - [[α-cyclopentylidene-α-phenyl-tolyl]oxy]-1,2-epoxypropane is productive of the corresponding N-3-[[α-cyclopentylidene-α-phenyl-tolyl]oxy] - 2 - hydroxy-propylsuccinimide. Representative of the succinimides so obtained are N-3-[[α-cyclopentylidene-α-(o-methoxyphenyl)-p-tolyl]oxy]-,
N-3-[[α-cyclopentylidene-α-(m-methoxyphenyl)-m-tolyl]oxy]-,
N-3-[[α-cyclopentylidene-α-phenyl-p-tolyl]oxy]-,
N-3-[[α-cyclopentylidene-α-(methylphenyl)-p-tolyl]oxy]-,
N-3-[[α-cyclopentylidene-α-(p-chlorophenyl)-p-tolyl]oxy]-,
N-3-[[α-cyclopentylidene-α-(o-chlorophenyl-p-tolyl]oxy]-,
N-3-[[α-cyclopentylidene-α-(m-chlorophenyl)-p-tolyl]oxy]-2-hydroxy-propylsuccinimide.

(C) 3 - [[α - CYCLOPENTYLIDENE - α - (p - METHOXYPHENYL) - p - TOLYL]OXY] - 2 - HYDROXY - PROPYLAMINE HYDROIODIDE

A mixture of 0.94 g. of N-3-[[α-cyclopentylidene-α-(p-methoxyphenyl)-p-tolyl]oxy]-2-hydroxy-propylsuccinimide (Example 8, part B) and 3 ml. of 50% sodium hydroxide in 30 ml. of ethanol is heated at reflux for 16 hours. The mixture is then concentrated at reduced pressure and the residue treated with 2.5 N hydroiodic acid. The mixture is extracted with three portions of methylene chloride. The residue which remained when the gum is taken to dryness is precipitated once from acetone with 2.5 N hydroiodic acid and then recrystallized twice from a mixture of benzene and cyclohexane. There is obtained 3-[[α-cyclopentylidene - α - (p-methoxyphenyl)-p-tolyl]oxy]-2-hydroxypropylamine hydroiodide, melting point 144–147° C.

Analyses.—Calcd. for $C_{22}H_{28}INO_3$ (percent): C, 54.89; H, 5.86. Found (percent): C, 54.53; H, 5.95.

Using the procedure described in Example 8, part C, but replacing N - 3 - [[α-cyclopentylidene-α-(p-methoxyphenyl)-β-tolyl]oxy]-2-hydroxy-propylsuccinimide by N-3-[[α-cyclopentylidene - α - phenyl-p-tolyl]oxy] - 2 - hydroxy-propylsuccinimide, N-3-[[α-cyclopentylidene-α-(p-methoxyphenyl)-p-tolyl]oxy] - 2 - hydroxypropylsuccinimide and N-3-[[α-cyclopentylidene-α-(p-chlorophenyl)-p-tolyl]oxy]-2-hydroxy-propylsuccinimide, there are obtained 3-[[α-cyclopentylidene-α-phenyl]-p-tolyl]oxy]-2-hydroxy-propylamine hydroiodide,
3-[[α-cyclopentylidene-α-(p-methylphenyl)-p-tolyl]oxy]-2-hydroxypropylamine hydroiodide, and
3-[[α-cyclopentylidene-α-(p-chlorophenyl)-p-tolyl]oxy]-2-hydroxypropylamine hydroiodide respectively.

(D) 3 - [[α - CYCLOPENTYLIDENE - α - (p - METHOXYPHENYL) - p - TOLYL]OXY] - 2 - HYDROXY - PROPYLAMINE

To a solution of 1.50 g. of 3-[[α-cyclopentylidene-2-(p-methoxyphenyl)-p-tolyl]oxy] - 2-hydroxypropylamine hydroiodide (Example 8, part C) in 20 ml. of methanol there is added 6.4 ml. of 0.49 N methanolic sodium methoxide. The mixture when taken to dryness yields a residue which is predominantly 3-[[α-cyclopentylidene-α-(p-methoxyphenyl)-p-tolyl]oxy]-2-hydroxy-propylamine.

(E) 5 - [[[α - CYCLOPENTYLIDENE - α - (p - METHOXYPHENYL) - p - TOLYL]OXY] - 2 - OXAZOLIDINETHIONE

To a solution of 1.68 g. of 3-[[α-cyclopentylidene-α-(p-methoxyphenyl)-p-tolyl]oxy] - 2-hydroxy-propylamine (Example 8, part D) in 70 ml. of ethanol there is added 0.62 ml. of carbon disulfide and 2.7 ml. of 25% potassium hydroxide. The mixture is heated for four hours at reflux and then taken to dryness. The residue is suspended in water and made acidic with 2.5 N hydrochloric acid. Then the precipitate is collected and chromatographed on 150 ml. of magnesium silicate (elution with 25% acetone in Skellysolve B hexanes). The crystalline fractions are combined and recrystallized from aqueous acetone to give 0.54 g. of crystalline 5-[[[α-cyclopentylidene-α-(p-methoxyphenyl)-p-tolyl]oxy]methyl] - 2-oxazolidenethione, melting point 154.5–156.5° C.

Analysis.—Calcd. for $C_{23}H_{25}NO_3S$ (percent): C, 69.84; H, 6.37; S, 8.11. Found (percent): C, 69.74; H, 6.16; S, 8.31.

Using the procedure of Example 8, part E, but replacing 3 - [[α-cyclopentylidene - α - (p-methoxyphenyl)-p-tolyl]oxy]-2-hydroxy-propylamine by 3 - [[α - cyclopentylidene-α-phenyl-p-tolyl]oxy] - 2 - hydroxy-propylamine, 3-[[α-cyclopentylidene-α-(p-methylphenyl)-p-tolyl]oxy] - 2-hydroxy-propylamine, and 3 - [[α-cyclopentylidene-α-(p-chlorophenyl)-p-tolyl]oxy]-2-hydroxy-propylamine, there are obtained 5 - [[[α-cyclopentylidene-α-phenyl-p-tolyl]oxy]methyl] - 2 - oxazolidinethione, 5 - [[[α-cyclopentylidene-α-(p-methylphenyl)-p-tolyl]oxy]methyl] - 2-oxazolidinethione and 5-[[[α-cyclopentylidene-α-(p-chlorophenyl)-p-tolyl]oxy]methyl] - 2 - oxazolidinethione respectively.

I claim:

1. A compound having the formula

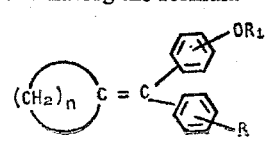

wherein n is an integer from 2 to 7; R represents hydrogen, alkyl containing from one to 4 carbon atoms, inclusive, alkoxy containing from one to 4 carbon atoms, inclusive, and halogen; and $R_1$ is

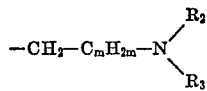

wherein m is an integer from one to 4, and $R_2$ and $R_3$ individually are similar or different alkyl groups containing from one to 4 carbon atoms, inclusive; and when taken together with the attached nitrogen atom form a pyrrolidino, methylpyrrolidino, piperazino, methylpiperazino, piperidino, methylpiperidino, morpholino, hexamethylenimino, or homopiperazino group.

2. A compound of claim 1 wherein methylpyrrolidino is 2-methylpyrrolidino, 2,2 - dimethylpyrrolidino, or 3-methylpyrrolidino.

3. A compound of claim 1 wherein methylpyrrolidino is 2-methylpyrrolidino, 2,2-dimethylpyrrolidino, or 3-methylpyrrolidino.

4. A compound of claim 1 wherein methylpiperidino is 2-methylpiperidino, 3-methylpiperidino, or 4,4-dimethylpiperidino.

5. A compound of claim 1 wherein n is 4 or 5, and R is alkoxy containing from one to 4 carbon atoms, inclusive.

6. A compound of claim 5 wherein n is 4, R is p-methoxy, and —$OR_1$ is p-pyrrolidinoethyloxy.

7. A compound of claim 5 wherein n is 5, R is p-methoxy, and —$OR_1$ is p-pyrrolidinoethyloxy.

References Cited
UNITED STATES PATENTS 3,288,806  11/1966  De Wald _____ 260—326.5
3,320,271  5/1967  Lednicer _____ 260—326.5 X ALEX MAZEL, Primary Examiner J. A. NARCAVAGE, Assistant Examiner U.S. Cl. X.R.

260—239 B, 239 BC, 268 R, 293.83, 295.55, 307 C, 326.5 FM, 343.7, 348 R, 570 R, 618 R; 424—244, 248, 250, 267, 274, 278, 320, 340

UNITED STATES PATENT OFFICE
CERTIFICATE OF CORRECTION

Case 2462

Patent No. 3,658,842          Dated April 25, 1972

Inventor(s) Daniel Lednicer

It is certified that error appears in the above-identified patent and that said Letters Patent are hereby corrected as shown below:

Column 6, line 62, for "[[[cyclohexyldiene-" read -- [[[cyclohexylidene- --. Column 6, line 70, for "1-2-" read -- 1[2- --. Column 7, line 9, for "1-2-" read -- 1[2- --. Column 7, line 12, for "oxy]ethyl]-" read -- oxy]propyl]- --. Column 7, line 15, for "1-[21[[" read -- 1-[2-[[ --. Column 10, line 8, for "]ethyl]-" read -- ]propyl]- --. Column 13, lines 20-22, claim 3, for "3. A compound of claim 1 wherein methyl-pyrrolidino is 2-methylpyrrolidino, 2,2-dimethylpyrrolidino, or 3-methylpyrrolidino." read -- 3. A compound of claim 1 wherein methylpiperazino is 2-methylpiperazino, 4-methylpiperazino, or 2,4-dimethylpiperazino. --.

Signed and sealed this 27th day of March 1973.

(SEAL)
Attest:

EDWARD M. FLETCHER, JR.
Attesting Officer

ROBERT GOTTSCHALK
Commissioner of Patents